United States Patent

Watlington

[15] 3,644,675

[45] Feb. 22, 1972

[54] POLLING METHOD UTILIZING TELEPHONE TRANSMISSION AND RECORDING SYSTEM

[72] Inventor: Frank W. Watlington, "Coralita", Pembroke, Bermuda

[22] Filed: June 4, 1970

[21] Appl. No.: 43,487

Related U.S. Application Data

[63] Continuation-in-part of Ser. No. 816,260, Apr. 15, 1969, abandoned.

[52] U.S. Cl. ....................179/2 AS, 179/6 R

[51] Int. Cl. ....................H04m 11/10

[58] Field of Search ....................179/2 AS, 2 CA, 2 DP, 2 A, 179/5 R, 5 P, 5.5, 6 R, 6 C, 6 D, 6 E

[56] References Cited

UNITED STATES PATENTS

| | | | |
|---|---|---|---|
| 2,691,063 | 10/1954 | Michelini | 179/5.5 |
| 2,750,445 | 6/1956 | Renton | 178/23 |
| 3,308,238 | 3/1967 | Brothman | 179/2 CA |
| 3,371,162 | 2/1968 | Scantlin | 179/2 DP |
| 3,376,389 | 4/1968 | Fair | 179/2 A |
| 3,387,082 | 6/1968 | Farber | 179/2 AS |
| 3,427,403 | 2/1969 | Stokes | 179/2 A |
| 3,502,813 | 3/1970 | Walker | 179/2 AS |

*Primary Examiner*—Ralph D. Blakeslee
*Attorney*—Edwin E. Greigg

[57] ABSTRACT

A calling party identification system utilizing the normal public telephone equipment and a special electronic package at the receiving terminal. This system may have numerous usages among them the taking of polls. Identification of the calling party is achieved using previously assigned digital information which may include his own telephone number and which the calling party dials in the normal manner into the electronic package which processes this digital information and may either dial back the calling party who has previously been instructed to "hang up," to ensure that the call is originating from the telephone number dialed, or other assigned numerals (or the telephone subscriber's own telephone number) are correlated with those recorded in a memory bank. If any one or all of these checks pass, the calling party is instructed to dial his voting numerals; if they do not, the call is rejected.

8 Claims, 4 Drawing Figures

INVENTOR
FRANK W. WATLINGTON

BY Edwin E. Greigg
ATTORNEY

INVENTOR
FRANK W. WATLINGTON

POLLING METHOD UTILIZING TELEPHONE TRANSMISSION AND RECORDING SYSTEM

This application is a continuation-in-part of application Ser. No. 816,260, filed Apr. 15, 1969, and now abandoned.

This invention relates to method and apparatus for polling opinions, votes or other desirable information from telephone subscribers and, more particularly, to a system for transmitting information having to do with public reaction in the form of dialed impulses or tone dialing over conventional telephone circuits and in which security precautions are maintained by identifying the calling subscriber.

Various interrogating systems have been proposed in the past for polling the public response on the popularity of television and radio programs. In such systems utilizing telephone lines for transmitting the opinion data, special signaling devices were connected to the telephone lines for the purpose of transmitting a range of prearranged signals to a central station where this data was compiled and analyzed.

The present invention serves to extend this concept by providing a polling system, as well as a voting system, in which conventional telephone circuits are utilized and in which no special signaling transmitter devices are employed. The system proposed by this invention is intended for use by the telephone subscriber who wishes to vote on some particular issue or answer previously known questions or fill out forms remotely by using the telephone encoder available to him. The system according to this invention can also be utilized to summon assistance, for example, from a fire department, a police department or from a hospital without the need to speak over the telephone. The present invention makes use of the encoding system which is available on the telephone line when it is open, this is, when the handsets are "up." Such a system is also practical with the pushbutton tone dialing system as well. The information transmitted according to this invention can be recorded and displayed numerically with relatively simple and inexpensive equipment which can be attached directly to the telephone lines or indirectly where the impulses can be recorded by conventional induction pickup methods.

Accordingly, it is an object of this invention to provide a system of communication available to a telephone subscriber who wishes to vote on a particular issue upon which it is desired to poll public reaction.

It is another object of this invention to provide a system for transmitting information by means of an impulse dialing or pushbutton tone dialing over conventional telephone lines at the instigation of a calling subscriber wherein security precautions are provided to ensure that the transmitted information is originating from an identifiable source.

It is another object of this invention to provide an information transmission system in which a telephone subscriber can utilize his telephone for registering a vote or other type of signal for a predetermined purpose without the need of operating additional equipment or attachments other than the telephone itself.

It is yet another object of this invention to provide a method for poll taking which employs relatively simple and inexpensive equipment which is compatible with conventional telephone line circuitry.

According to one method utilizing the principles of this invention, a telephone ringing circuit is connected to a programmer which connects a resistance in the telephone line that simulates a telephone circuit for signaling the automatic telephone exchange to stop its ringing signal. The programmer then disconnects the ringing circuit and momentarily connects an oscillator into the line for signaling the telephone subscriber that he may commence dialing. The dialing impulses are picked up either directly or by induction by a pulse shaping circuit and passed through a rotary switch to a decade printer where the pulses are recorded. At the end of each set of dialed pulses the pulse shaping circuit causes the rotary switch to move one step alternatively switching in a new decade column in the decade printer, the subscriber having now registered his identification number (his own telephone number on a previously assigned number), as well as his voting number or numbers. A programming switch, which has been running for a given amount of time in order to allow the subscriber to act, supplies a signal to the decade printer to print, as well as reset the entire system back to zero for beginning another cycle.

Other objects and advantages will become apparent from a detailed study of the following specification and drawings, in which.

Figure 1:
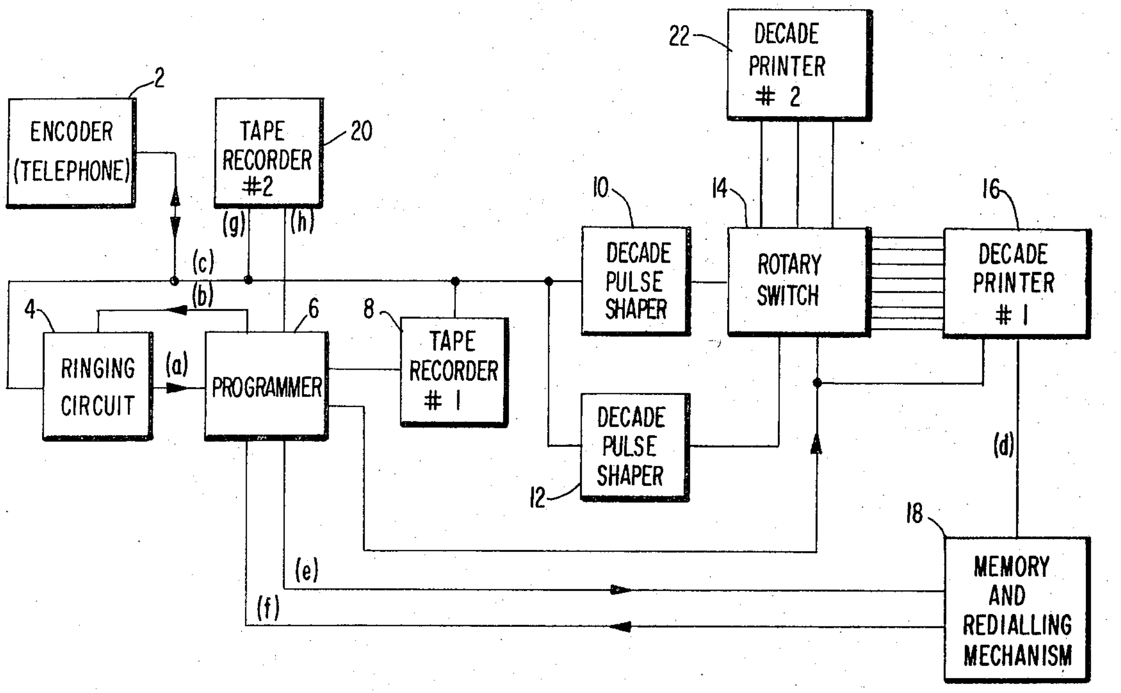
FIG. 1 illustrates a circuit block diagram of an apparatus arranged according to the principles of this invention and operated by a method embodying those principles.

Referring now to FIG. 1, there is shown an ordinary subscriber's telephone 2 after the subscriber has established connection with the system of the invention in a manner to be described in more detail below. Telephone 2 is then connected to a ringing circuit 4 of the system, which connects through path *a* to a programmer 6. The programmer 6 is connected by a return path *b* to the ringing circuit. A tape recorder 8 is connected to the programmer as well as to the line *c*. Two decade pulse shapers 10 and 12 are shown connected in parallel to line *c*, both of which, in turn, are connected to a rotary switch 14. The pulse shapers receive the impulses from the telephone line which may have become altered from their original shape, for example, through missing high frequencies and, accordingly, as well known in the art, these pulses are shaped to their original form so that they may better actuate the various relays in the system. The system may be either directly connected or inductively connected to the line *c* by well-established methods known to those skilled in the art. A decade printer 16 is connected to the rotary switch 14, to the programmer 6, and to a memory and redialing mechanism 18, which in a simplified case may be a tape recorder with a closed loop tape for recording and playing back the signals transmitted thereto as an identification number (or telephone number). This redialing function may also be accomplished by using digital circuitry according to techniques well known in the art. For example, the memory circuit may be, in the more complicated case, a digital computer. Here the incoming digits are correlated with those previously registered in a memory bank for identification purposes. If correlation occurs, the subscriber is called back by redialing his called in number; if correlation does not occur, the call is dropped. An input path *e* and an output path *f* connect the memory and redialing mechanism 18 to the programmer 6. A second tape recorder 20 is connected to the line *c* as well as the programmer 6 through paths *g* and *h*, respectively, and a second printer 22 is connected directly to the rotary switch element 14. The pulse shaper 10 actuates a counting relay for actuating one of the printer decades 16, 22 and the pulses from the shaper 12 are stored in a suitable capacitor, the potential of which holds open a relay. Thus, when there are no pulses transmitted over the line *c*, the power fails and is no longer supplied to the storage capacitor of the pulse shaper 12. This allows the stored energy to drain off through the relay coil. When there is insufficient power to hold open this relay, it closes and actuates the rotary switch 14 to move one step to connect the next decade on the printer 16 or 22 preparatory to receiving the next train of dialed pulses.

Figure 2:
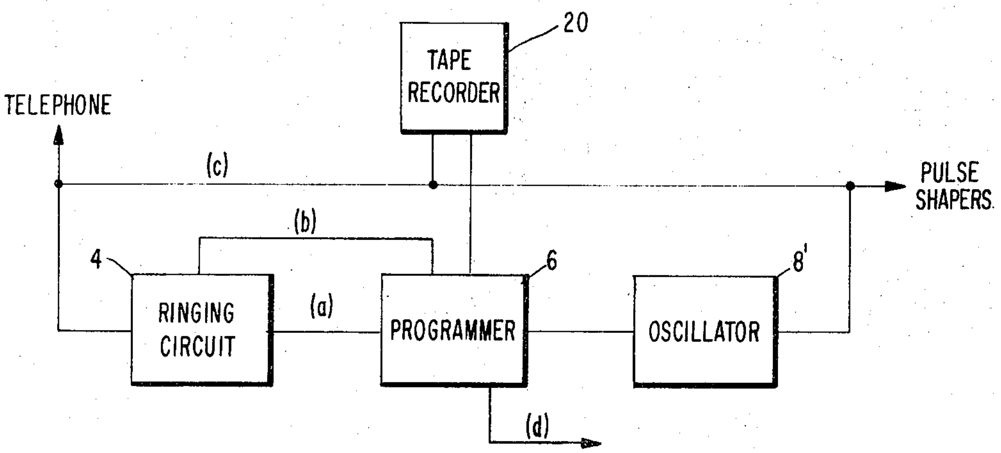
FIG. 2 illustrates a modification of the circuit shown in FIG. 1.

In FIG. 2 there is shown a further modification of the circuit in which the tape recorder 8 is replaced with an oscillator 8' for signaling the telephone subscriber. With this arrangement the tape recorder 20 may also be dispensed with, as will be explained below. Furthermore, this modified system omits the customer identification feature simplifying the system for limited use.

Figure 3:
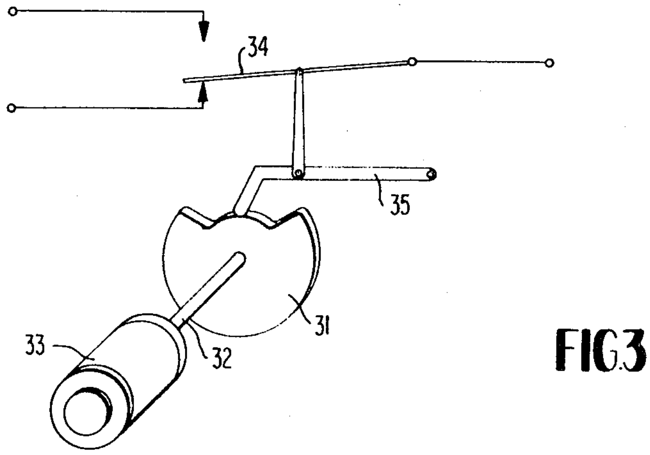
FIG. 3 shows the construction of the programmer.

FIG. 3 illustrates the operation of the programming switch 6. To simplify this explanation only one cam 31 is illustrated. However, as many cams as are needed can be attached to the shaft 32 which is driven by a synchronous motor 33. The synchronous motor provides the necessary timing which will be dependent on the powerline frequency and is adequate for the present purpose.

Each cam 31 may be adjustable relative to the shaft 32 as well as with regard to its extension along the circumference in order that a particular timer switch 34 may remain on or off for any percentage of the single rotation of the synchronous motor timing period, and the point in time at which a switch is actuated may be adjusted. The cam operates a pivoted arm 35 for actuating the switch 34.

The synchronous motor timing period is selected so that one rotation of the shaft will provide sufficient time for all functions depending on the usage; this is normally one-half to 1 minute.

Figure 4:
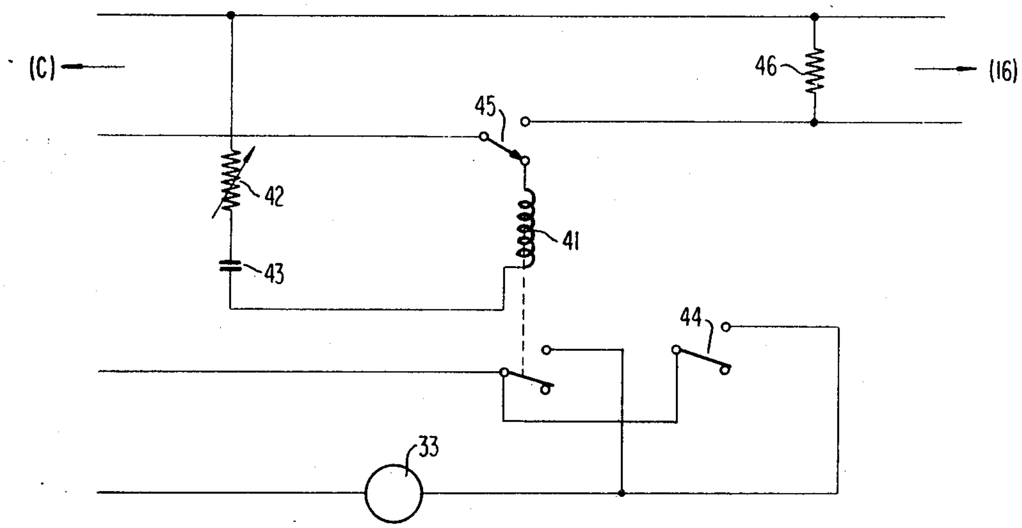
FIG. 4 is a diagram of the ringing circuit.

FIG. 4 illustrates details of the ringing circuit 4 which functions as follows: After the subscriber has dialed the number of the FIG. 1 or FIG. 2 apparatus, the telephone exchange sends out a ringing tone. This tone actuates a relay 41 through a resistor 42 and a capacitor 43. The contacts of this relay are in parallel with the switch 44 associated with the first cam on the programmer. Each time the ringing tone from the telephone company occurs, it closes the relay contacts which applies power to the programmer synchronous motor 33 until eventually the cam closes the switch 44 on the programmer permanently. The number of ringing tone impulses necessary before this permanent connection occurs depends on the setting of No. 1 cam on the programmer shaft 32.

At the end of the timing cycle of the programmer the cam opens the motor power circuit stopping it.

The cam associated with another programmer switch 45 is set to disconnect the ringing circuit relay and to connect across the telephone line a resistor 46. This resistor 46 signals the main telephone exchange to stop the ringing tone as it simulates the impedance of the normal transmitter associated with the telephone system; closing switch 45 and placing resistor 46 across the line simulates the normal action of a subscriber picking up his telephone to receive.

The proper sequence of events occurs because of the setting of the cams on the programmer.

OPERATION OF THE FIG. 1 AND FIG. 2 SYSTEM

A switch and cam on the programmer 6 are associated with the recorder 8 (FIG. 1). When the ringing tone stops, recorder 8 is actuated by the programmer cam and announces that the subscriber should send his own telephone number and hang up. The programmer then shuts itself off and does not again get turned on until all the digits have been received.

The subscriber raises his telephone or encoder 2 and dials the number of the FIG. 1 system, which given him access to the machine shown in FIG. 1. Ringing from the telephone company central office actuates the ringing circuit 4 which applies power to the programmer 6 through path *a* and it commences to rotate. Programmer switch 45, as explained with reference to FIG. 4, then connects resistance 46 across the telephone line, which simulates a handset circuit. This causes the automatic telephone exchange to stop the ringing signal. Switch 45 is a single-pole double-throw unit with the swinger connected to the incoming telephone line and disconnects the ringing circuit 4 with the insertion of the resistance, as described in connection with FIG. 4. Another switch on the programmer starts the tape recorder 8, which stops the programmer. The tape recording announces "you may now dial your own identification number and then hang up your telephone; we will call you back." The subscriber's identification number, his own telephone number (in this case) is recorded on decade printer 16 and the memory and redialing mechanism 18 through the decade pulse shaper 10 and the rotary switch 14 over paths *c* and *d*.

The decade pulse shaper 12 functions as a controlling device to switch decades through the rotary switch 14 ensuring that each numeral finds its own column on the decade printer 16. The impulses from the dialing operation hold in a relay until the end of the train. At the termination of the train this relay falls out and supplies the necessary impulse to switch the rotary switch 14 to the next column.

Impulses received at the final decade print will serve as a signal to the programmer, previously halted by tape recorder 8 sending its message, to recommence its cycle. A switch on programmer 6 now opens the telephone circuit for approximately 10 seconds freeing it for the dialing operation that reestablishes the contact with the subscriber. At the end of 10 seconds the line is again closed and dial tone is heard.

The dial tone arrives at the memory and redialing mechanism 18 over path *e* from the telephone line through switch of programmer 6 and signals the commencement of the redialing operation. The recorded message operates a relay that interrupts the telephone line circuit just as the dial on the telephone would and does so through a programmer switch via paths *f* and *c*.

Another switch on the programmer 6 connects across the telephone line tape recorder 20 sensitive to ringing tone on the telephone line. When the subscriber picks up his telephone, ringing tone stops, which causes tape recorder 20 to commence and playback its prerecorded message. This message announces "you may now dial your voting digits." These digits are recorded on decade printer 22 only, ensuring that the vote is secret.

Continuation of the cycle of the programmer 6 through switches on its shaft sets everything back to zero in readiness for the next customer's call.

Programmer 6 controls all of the above functions by means of the switches, one of which was described in connection with FIG. 3, and which are turned on and off at a particular time and remain on or off for a certain percentage of the 360 degree rotation of shaft 32. One revolution of shaft 32 is one cycle and happens during a single event or customer's call.

In the simplified system of FIG. 2, not incorporating a customer identification feature, tape recorder 8 is replaced by a 1,000-cycle oscillator 8' and in this case the programmer 6 after disconnecting the ringing circuit through path *b* will momentarily connect the oscillator 8' into the open line *c* and thus signal the telephone subscriber that he may commence dialing. At the end of the dialing period the programmer again actuates the 1,000-cycle oscillator signifying the end of this period to the customer. The programmer 6 then sets the system back to readiness for the next customer call.

From the above it will be seen that a poll-taking system can be implemented with a minimum amount of equipment for use with existing telephone circuitry. Such a system would be desirable for a number of uses, for example, radio and TV stations frequently like to know about the popularity of their programs and a system according to the principles of this invention would provide the individual with a reliable means to register a vote of approval or disapproval in answer to specific questions previously published or made known to the subscriber through other communication media. Also, politicians or public figures may wish to know the popularity of their policies and by means of this system subscribers would be in a position to register their reaction under conditions of complete security. Thus, the subscriber's identity is established before he is allowed to vote over his telephone by reason of the fact that he will be told to hang up his telephone after he has dialed his own number and a given number, at which time the system according to this invention, after correlation with registered numbers, will reestablish contact with the subscriber at the given number. He is then allowed to register his vote in complete confidence.

In the case where security precautions are not necessary, the system according to this invention can be simplified such that the secondary printer 22 and the memory circuit and redial mechanism 18 may be eliminated completely as well as both tape recorders 8 and 20. In this arrangement, of course, the oscillator 8' would be substituted for the tape recorder 8. The method of operation would have the telephone ringing circuit actuating the programmer 6 through the path *a* (see FIGS. 1 and 2) with the programmer then connecting a resistance in the telephone line that simulates a telephone circuit for signaling the automatic telephone exchange to stop the ringing signal. The programmer then disconnects the ringing circuit through path *b* and momentarily connects the oscillator 8' into the line thus signaling the subscriber that he may commence dialing. Dialing impulses are then received along path *c* at the pulse shapers 10 and 12 and passed through the rotary switch 14 to the decade printer 16 where the impulses are recorded. The subscriber has now registered his identification number which may be his own telephone number or a previously assigned number as well as his voting number or numbers. The programmer which has been running for a given amount of time to allow this sequence of events to take place provides the signal for the printer 16 to print and then reset the system back to zero preparatory to starting another cycle. If the subscriber must then be contacted, his phone number is available.

That which is claimed is:

1. A system for transmitting information over an open telephone line having a telephone transmitter receiver and a ringing circuit comprising, a programmer means connected to said ringing circuit for disconnecting said circuit from said open line, a signal transmission means connected to said programmer and to said open line for transmitting a message to said telephone transmitter receiver, pulse-shaping means connected to said open line, a first printing means having a rotary switch control connected to said pulse-shaping means for recording pulses from said telephone transmitter receiver, a redialing means connected to said first printing means and to said programmer means for signaling said telephone transmitter receiver and a second printing means connected to said rotary switch control for recording additional pulses from said telephone transmitter receiver.

2. A system for transmitting information over an open telephone line having a telephone signal transmitter receiver and a ringing circuit comprising, a programmer means connected to said ringing circuit for disconnecting said circuit from said open line, a first signal transmission means connected to said programmer and to said open line for transmitting a message to said telephone transmitter receiver, pulse-shaping means connected to said open line, a first printing means have a rotary switch control connected to said pulse-shaping means for recording pulses from said telephone signal transmitter receiver, redialing means connected to said first printing means and to said programmer means for signaling said telephone transmitter receiver, a second signal transmission means connected to said programmer means for transmitting a message to said telephone transmitter receiver, and a second printing means connected to said rotary switch control for recording additional pulses from said telephone transmitter receiver.

3. A system for transmitting information over an open telephone line as claimed in claim 2, wherein said first and second signal transmission means is a tape recorder.

4. A system for transmitting information over an open telephone line as claimed in claim 1, wherein said signal transmission means is an oscillator.

5. A system for transmitting information over an open telephone line as claimed in claim 1, wherein said signal transmission means is a tape recorder.

6. A method for transmitting information over an open telephone line having a telephone transmitter receiver and a ringing circuit comprising the steps of, terminating said ringing circuit energized by the operation of said telephone transmitter receiver, introducing a return signal to said telephone transmitter receiver for indicating that the telephone subscriber can transmit impulses over said open line, recording and printing said transmitted impulses in the form of decade pulses, and redialing said telephone subscriber at said telephone transmitter receiver to indicate to said subscriber to transmit an additional set of impulses.

7. A method for transmitting information over an open telephone line having a telephone transmitter receiver and a ringing circuit, comprising the steps of, terminating said ringing circuit energized by the operation of said telephone transmitter receiver, introducing a return signal to said telephone transmitter receiver for indicating that the telephone subscriber can transmit impulses over said open line, storing said transmitted impulses, and redialing said telephone subscriber at said telephone transmitter receiver to indicate to said subscriber to transmit an additional set of impulses.

8. A method for transmitting information over an open telephone line having a telephone transmitter receiver and a ringing circuit, comprising the steps of, terminating said ringing circuit energized by the operation of said telephone transmitter receiver, introducing a first return signal to said telephone transmitter receiver for indicating that the telephone subscriber can transmit impulses over said open line, recording and printing said impulses in the form of decade pulses, storing said decade pulses, redialing said telephone subscriber at said telephone transmitter receiver, and introducing a second signal over said open line to indicate to said subscriber to transmit an additional set of impulses.

* * * * *